US011967019B1

(12) United States Patent
Golovanov et al.

(10) Patent No.: US 11,967,019 B1
(45) Date of Patent: Apr. 23, 2024

(54) DEPTH MAPS AND 3D RECONSTRUCTION WITH SEGMENTATION MASKS

(71) Applicant: Varjo Technologies Oy, Helsinki (FI)

(72) Inventors: Roman Golovanov, Helsinki (FI); Tarek Mohsen, Espoo (FI); Petteri Timonen, Helsinki (FI); Oleksandr Dovzhenko, Espoo (FI); Ville Timonen, Helsinki (FI); Tuomas Tölli, Helsinki (FI); Joni-Matti Määttä, Tampere (FI)

(73) Assignee: Varjo Technologies Oy, Helsinki (FI)

( * ) Notice: Subject to any disclaimer, the term of this patent is extended or adjusted under 35 U.S.C. 154(b) by 60 days.

(21) Appl. No.: 17/971,771

(22) Filed: Oct. 24, 2022

(51) Int. Cl.
*G06T 17/00* (2006.01)
*G06T 7/12* (2017.01)
*G06T 7/593* (2017.01)
*G06V 10/22* (2022.01)
*G06V 10/764* (2022.01)

(52) U.S. Cl.
CPC ............... *G06T 17/00* (2013.01); *G06T 7/12* (2017.01); *G06T 7/593* (2017.01); *G06V 10/22* (2022.01); *G06V 10/764* (2022.01); *G06T 2200/08* (2013.01); *G06T 2207/10012* (2013.01); *G06T 2207/10024* (2013.01); *G06T 2207/10028* (2013.01); *G06T 2207/20021* (2013.01); *G06T 2207/30244* (2013.01)

(58) Field of Classification Search
CPC ........... G06T 17/00; G06T 7/12; G06T 7/593; G06T 2200/08; G06T 2207/10012; G06T 2207/10024; G06T 2207/10028; G06T 2207/20021; G06T 2207/30244; G06V 10/22; G06V 10/764
See application file for complete search history.

(56) References Cited

U.S. PATENT DOCUMENTS

| | | | |
|---|---|---|---|
| 11,624,660 B1 * | 4/2023 | Russo | G06F 18/24 348/144 |
| 2017/0132769 A1 * | 5/2017 | Barron | G06T 5/20 |
| 2020/0265622 A1 * | 8/2020 | Pettersson | G06T 11/60 |
| 2021/0027479 A1 * | 1/2021 | Price | H04N 23/45 |
| 2023/0360247 A1 * | 11/2023 | Chew | H04N 23/11 |

* cited by examiner

*Primary Examiner* — Xilin Guo
(74) *Attorney, Agent, or Firm* — Ziegler IP Law Group

(57) ABSTRACT

A method including: receiving visible-light images captured using camera(s) and depth data corresponding to said images; identifying image segments of visible-light image that represent objects or their parts belonging to different material categories; detecting whether at least two adjacent image segments in visible-light image pertain to at least two different material categories related to same object category; and when it is detected that at least two adjacent image segments pertain to at least two different material categories related to same object category, identifying at least two adjacent depth segments of depth data corresponding to at least two adjacent image segments; and correcting errors in optical depths represented in at least one of at least two adjacent depth segments, based on optical depths represented in remaining of at least two adjacent depth segments.

17 Claims, 4 Drawing Sheets

DEPTH MAPS AND 3D RECONSTRUCTION WITH SEGMENTATION MASKS

TECHNICAL FIELD

The present disclosure relates to methods for improving depth maps and three-dimensional (3D) reconstruction. The present disclosure also relates to systems for improving depth maps and 3D reconstruction. The present disclosure further relates to computer program products for improving depth maps and 3D reconstruction.

BACKGROUND

With advancements in evolving technologies such as immersive extended-reality (XR) technologies, demand for high-quality image reconstruction has been increasing. It is desired that the image reconstruction is performed in real time or near-real time. Several advancements are being made to develop image reconstruction techniques that facilitate high-quality three-dimensional (3D) reconstruction of a real-world environment, at real time framerates. This subsequently enables a user to witness an immersive and realistic remote telepresence experience.

However, existing techniques and equipment for image reconstruction have several limitations associated therewith. Firstly, the existing techniques and equipment are not well-suited for high-fidelity 3D reconstruction of the real-world environment that aims to reconstruct images from novel viewpoints. This is because quality of the 3D reconstruction provided by the existing techniques is bottlenecked by low-quality (i.e., low-resolution as well as inaccurate) depth maps utilized for said 3D reconstruction. Resultantly, reconstructed images are suboptimal, i.e., low quality and unrealistic. This leads to a poor, non-immersive viewing experience for a user.

Secondly, the existing techniques and equipment are not well-suited in terms of accurately detecting and reproducing edges of the objects in the reconstructed images. In such a case, there may be problems such as edge leaking to background of the objects and empty gaps which are visible in the images. Such problems arise, for example, due to at least one of: presence of dynamic objects in the real-world environment (because of which their position is temporally inconsistent in visible-light images and corresponding depth images), reflective properties of different materials (for example, such as human hair that diffuses light). The aforesaid problems are often associated with employing long-range depth estimation algorithm by some existing techniques.

Referring to FIGS. 1A and 1B (that represent Prior Art), FIG. 1A illustrates an input image 100, while FIG. 1B illustrates a depth map corresponding to the input image 100. With reference to FIG. 1A, the input image 100 represents a living object, for example, such as a human. There are shown different parts, for example, such as skin 102 and hair 104 of the human. With reference to FIG. 1B, the depth image represents different depth segments for the different parts of the human. Due to reflective properties of the hair 104, optical depths represented in a depth segment (depicted as a horizontal lines pattern) corresponding to the hair 104 of the human are inaccurately detected, and thus are significantly different from optical depths represented in a depth segment (depicted as a dotted pattern) corresponding to the skin 102 of the human. Moreover, edges and boundaries of the aforesaid depth segments are also improper and inaccurate.

Therefore, in light of the foregoing discussion, there exists a need to overcome the aforementioned drawbacks associated with the existing techniques and equipment for image reconstruction.

SUMMARY

The present disclosure seeks to provide a method for improving depth maps and three-dimensional (3D) reconstruction. The present disclosure also seeks to provide a system for improving depth maps and 3D reconstruction. The present disclosure also seeks to provide a computer program product for improving depth maps and 3D reconstruction. An aim of the present disclosure is to provide a solution that overcomes at least partially the problems encountered in prior art.

In a first aspect, an embodiment of the present disclosure provides a computer-implemented method comprising:
  receiving a plurality of visible-light images of a real-world environment captured using at least one camera and depth data captured corresponding to the plurality of visible-light images;
  identifying image segments of a given visible-light image that represent objects or their parts belonging to different material categories, the objects being present in the real-world environment;
  detecting whether at least two adjacent image segments in the given visible-light image pertain to at least two different material categories that are related to a same object category; and
  when it is detected that at least two adjacent image segments pertain to at least two different material categories that are related to a same object category,
    identifying at least two adjacent depth segments of given depth data corresponding to respective ones of the at least two adjacent image segments of the given visible-light image; and
    correcting errors in optical depths represented in at least one of the at least two adjacent depth segments, based on optical depths represented in remaining of the at least two adjacent depth segments.

In a second aspect, an embodiment of the present disclosure provides a system comprising at least one server and a data repository communicably coupled to the at least one server, wherein the at least one server is configured to:
  receive a plurality of visible-light images of a real-world environment captured using at least one camera and depth data captured corresponding to the plurality of visible-light images;
  identify image segments of a given visible-light image that represent objects or their parts belonging to different material categories, the objects being present in the real-world environment;
  detect whether at least two adjacent image segments in the given visible-light image pertain to at least two different material categories that are related to a same object category, wherein information pertaining to the at least two different material categories that are related to the same object category is accessed from the data repository; and
  when it is detected that at least two adjacent image segments pertain to at least two different material categories that are related to a same object category,
    identify at least two adjacent depth segments of given depth data corresponding to respective ones of the at least two adjacent image segments of the given visible-light image; and correct errors in optical depths represented in at least one of the at least two adjacent depth segments, based on optical depths represented in remaining of the at least two adjacent depth segments.

In a third aspect, an embodiment of the present disclosure provides a computer program product comprising a non-transitory machine-readable data storage medium having stored thereon program instructions that, when executed by a processor, cause the processor to execute steps of the computer-implemented method of the first aspect.

Embodiments of the present disclosure substantially eliminate or at least partially address the aforementioned problems in the prior art, and facilitates in improving quality of depth maps and 3D reconstruction, thereby enabling reconstruction of images having high realism and high visual fidelity in real time or near-real time.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein:

FIG. 3B illustrates a segmentation mask corresponding to the visible-light image, while

Figure 1A:
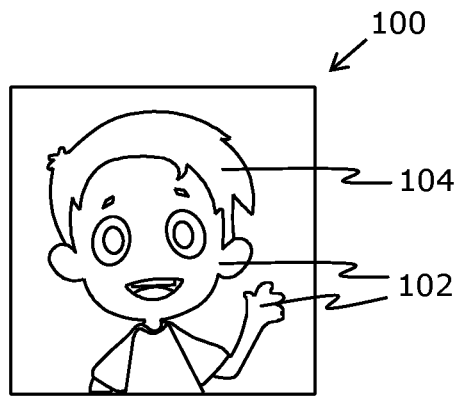
FIG. 1A (Prior Art) illustrates an input image, while FIG. 1B (Prior Art) illustrates a depth map corresponding to the input image.
Figure 1B:
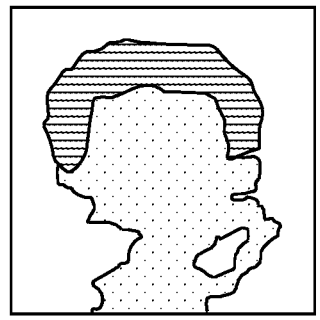

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides a computer-implemented method comprising:
  receiving a plurality of visible-light images of a real-world environment captured using at least one camera and depth data captured corresponding to the plurality of visible-light images;
  identifying image segments of a given visible-light image that represent objects or their parts belonging to different material categories, the objects being present in the real-world environment;
  detecting whether at least two adjacent image segments in the given visible-light image pertain to at least two different material categories that are related to a same object category; and
  when it is detected that at least two adjacent image segments pertain to at least two different material categories that are related to a same object category,
    identifying at least two adjacent depth segments of given depth data corresponding to respective ones of the at least two adjacent image segments of the given visible-light image; and
    correcting errors in optical depths represented in at least one of the at least two adjacent depth segments, based on optical depths represented in remaining of the at least two adjacent depth segments.

In a second aspect, an embodiment of the present disclosure provides a system comprising at least one server and a data repository communicably coupled to the at least one server, wherein the at least one server is configured to:
  receive a plurality of visible-light images of a real-world environment captured using at least one camera and depth data captured corresponding to the plurality of visible-light images;
  identify image segments of a given visible-light image that represent objects or their parts belonging to different material categories, the objects being present in the real-world environment;
  detect whether at least two adjacent image segments in the given visible-light image pertain to at least two different material categories that are related to a same object category, wherein information pertaining to the at least two different material categories that are related to the same object category is accessed from the data repository; and
  when it is detected that at least two adjacent image segments pertain to at least two different material categories that are related to a same object category,
    identify at least two adjacent depth segments of given depth data corresponding to respective ones of the at least two adjacent image segments of the given visible-light image; and correct errors in optical depths represented in at least one of the at least two adjacent depth segments, based on optical depths represented in remaining of the at least two adjacent depth segments.

In a third aspect, an embodiment of the present disclosure provides a computer program product comprising a non-transitory machine-readable data storage medium having stored thereon program instructions that, when executed by a processor, cause the processor to execute steps of the computer-implemented method of the first aspect.

The present disclosure provides the aforementioned method, the aforementioned system, and the aforementioned computer program product for improving quality of depth maps and 3D reconstruction, thereby enabling reconstruction of images having high realism and high visual fidelity in real time or near-real time. The method and the system are susceptible to be implemented for high-fidelity 3D reconstruction of the real-world environment that aims to reconstruction images from novel viewpoints, as high-quality depth maps having highly accurate depth data are utilized for said 3D reconstruction. This potentially leads to a realistic, immersive viewing experience for a user, when the reconstructed images are displayed to the user. Moreover, the method enables in accurately detecting and reproducing edges of the objects in the images. The computer-implemented method and the system are simple, robust, support real-time high-quality 3D reconstruction and accurate rectification of depth maps, and can be implemented with ease.

Notably, the at least one server controls an overall operation of the system. In some implementations, the at least one server is implemented as a remote server. In an example, the remote server could be a cloud server that provides a cloud computing service. In other implementations, the at least one server is implemented as a processor of a device comprising the at least one camera or as a processor of a computing device communicably coupled to the device. Examples of the device include, but are not limited to, a head-mounted display device and a teleport device. Examples of the computing device include, but are not limited to, a laptop, a desktop, a tablet, a phablet, a personal digital assistant, a workstation, and a console.

The term "head-mounted display" device refers to a specialized equipment that is configured to present an extended-reality (XR) environment to a user when said HMD device, in operation, is worn by the user on his/her head. The HMD device is implemented, for example, as an XR headset, a pair of XR glasses, and the like, that is operable to display a visual scene of the XR environment to the user. The term "extended-reality" encompasses virtual reality (VR), augmented reality (AR), mixed reality (MR), and the like. The term "teleport device" refers to a specialized equipment that is capable of facilitating virtual teleportation.

It will be appreciated that the term "at least one server" refers to "a single server" in some implementations, and to "a plurality of servers" in other implementations. When the system comprises the single server, all operations of the system are performed by the single server. When the system comprises the plurality of servers, different operations of the system can be performed by different (and specially configured) servers from amongst the plurality of servers. As an example, a first server from amongst the plurality of servers may be configured to identify the image segments of the given visible-light image, and a second server from amongst the plurality of servers may be configured to correct the errors in the optical depths represented in the at least one of the at least two adjacent depth segments.

Throughout the present disclosure, the term "data repository" refers to hardware, software, firmware, or a combination of these for storing information pertaining to different material categories that are related to a same object category, and optionally, the plurality of visible-light images and the depth data. It will be appreciated that the data repository could, for example, be implemented as a memory of the at least one server, a memory of the device, a memory of the computing device, a removable memory, a cloud-based database, or similar.

Throughout the present disclosure, the term "camera" refers to an equipment that is operable to detect and process light signals received from the real-world environment, so as to capture at least visible-light image(s) of the real-world environment. Optionally, a given camera is implemented as a visible-light camera. Examples of the visible-light camera include, but are not limited to, a Red-Green-Blue (RGB) camera, a Red-Green-Blue-Alpha (RGB-A) camera, a Red-Green-Blue-Depth (RGB-D) camera, an event camera, and a monochrome camera. Alternatively, optionally, a given camera is implemented as a combination of a visible-light camera and a depth camera. Examples of the depth camera include, but are not limited to, a Red-Green-Blue-Depth (RGB-D) camera, a ranging camera, a Light Detection and Ranging (LiDAR) camera, a Time-of-Flight (ToF) camera, a Sound Navigation and Ranging (SONAR) camera, a laser rangefinder, a stereo camera, a plenoptic camera, and an infrared (IR) camera. As an example, the given camera may be implemented as the stereo camera. It will be appreciated that a given visible-light image is a visual representation of the real-world environment. The term "visual representation" encompasses colour information represented in the given visible-light image, and additionally optionally other attributes associated with the given visible-light image (for example, such as depth information, luminance information, transparency information, and the like).

Optionally, the at least one server is configured to receive the plurality of visible-light images and the depth data from any one of:
- the device comprising the at least one camera, wherein the at least one camera is implemented as a combination of at least one visible-light camera and at least one depth camera,
- the at least one camera being implemented as a combination of the at least one visible-light camera and the at least one depth camera,
- the data repository in which the plurality of visible-light images and the depth data are prestored.

It will be appreciated that depth data corresponding to a given visible-light image is captured with respect to a perspective of a pose of the at least one camera which is employed for capturing the given visible-light image. In addition to this, the given visible-light image and the given depth data are contemporaneously captured. Optionally, the depth data is in form of at least one of: depth images, phase images, amplitude frames. A given depth image is indicative of optical depths of the objects or their parts present in the real-world environment from a perspective of a given camera which captured the given depth image. A given phase image is representative of a phase shift between a modulated light signal used to illuminate the real-world environment and a reflection of the modulated light signal. A given amplitude frame comprises an array of pixels, each pixel having an amplitude energy value.

Optionally, the given depth image is in a form of a depth map. Herein, the term "depth map" refers to a data structure comprising information pertaining to the optical depths of the objects or their parts present in the real-world environment. The depth map could be an image comprising a plurality of pixels, wherein a pixel value of each pixel indicates an optical depth of its corresponding real point within the real-world environment. It will be appreciated that the depth map could also be generated using at least one of: depth from stereo, depth from focus, depth from reflectance, depth from shading, when the at least one camera has at least one of: a coded aperture, a sensor chip having phase detection autofocus (PDAF) pixels, a sensor chip in which some of its pixels are IR pixels. Such IR pixels can detect, for example, a structured light at an active-IR illumination. It will also be appreciated that the depth map could also generated even without using the depth camera. In this regard, the depth map could be generated by using at least one of: a neural network model, a monocular depth estimation technique, a monochrome image. The monocular depth estimation technique may employ a single (monocular) RGB image for estimating depth values to generate the depth map.

Throughout the present disclosure, the term "image segment" of the given visible-light image from amongst the plurality of visible-light images refers to a portion of the given visible-light image that represent a given object or its part present in the real-world environment. It will be appreciated that a given image segment of the given visible-light image may or may not have a defined shape and/or size.

In an embodiment, when identifying the image segments that represent objects or their parts belonging to the different material categories, the at least one server is configured to: divide the given visible-light image into a plurality of image segments, based on spatial geometries of the objects or their parts present in the real-world environment, and identify the different material categories to which the plurality of image segments belong. In this way, the at least one server could easily identify an image segment corresponding to the given object or its part having a particular material category. Herein, the term "spatial geometry" relates to shapes and relative arrangements of the objects or their parts present in the real-world environment. Optionally, the at least one server is configured to employ at least one computer vision algorithm in order to identify the spatial geometry of the objects or their parts. In this regard, the at least one computer vision algorithm processes the given visible-light image to extract information pertaining to said spatial geometry therefrom. Such computer vision algorithms are well-known in the art. Additionally or alternatively, optionally, the at least one server is configured to train at least one convolutional neural network using at least one deep learning algorithm for identifying the spatial geometry of the objects or their parts.

Throughout the present disclosure, the term "material category" refers to a type of material that a given object or its part could be made of. It will be appreciated that the given object may be made of a single material or a plurality of materials. In this regard, when the given object is made of the plurality of materials, different parts of the given object could be made of different materials. A material from which the given object or its part is made belongs to a corresponding material category. Furthermore, the term "object category" refers to a type of object which could be made of or could be associated with at least two different materials.

In an example, when a human (or an animal) is represented in the given visible-light image, different parts of the human may correspond to different material categories, for example, 'hair' of the human, 'skin' of the human, 'fabric' worn by the human, and the like, and thus said different parts of the human may be represented by different image segments in the given visible-light image. As an example, a 'fabric' material category may comprise materials like cotton, polyester, silk, nylon, wool, lace, jute, or similar. In another example, when a food storage container is represented in the given visible-light image, different parts (such as a body and a lid) of the food storage container may correspond to different material categories, for example, such as 'glass' and 'plastic', and thus said different parts of the food storage container may be represented by different image segments in the given visible-light image. As an example, a 'plastic' material category may comprise materials like polyethylene terephthalate, polypropylene, polystyrene, or similar.

In another embodiment, when identifying the image segments of the given visible-light image, the at least one server is configured to employ at least one artificial intelligence (AI)-based object identification algorithm. The AI-based object identification algorithms are well-known in the art. In an example, the at least one server is configured to train at least one convolutional neural network using at least one deep learning algorithm for identifying the material categories to which the objects or their part belong. Optionally, in this regard, the at least one server employs at least one material database for training the at least one convolutional neural network.

Notably, for the given visible-light image, when at least two image segments pertain to at least two different material categories that are related to a same object category, i.e., when the at least two image segments represent different parts of a same object that are made of different materials, it is highly likely that the at least two image segments are adjacent to each other in the given visible-light image. This is because the different parts of the same object are likely to be in proximity with each other. Therefore, the at least one server detects the (aforesaid) at least two image segments which are adjacent to each other i.e., the at least two adjacent image segments.

Optionally, the method further comprises identifying, from amongst the different material categories, at least two different material categories that are related to a same object category. In other words, the at least one server identifies which material categories (from amongst the different material categories) are related to which object categories i.e., which material categories are different from each other but yet are related to the same object category. Such an identification may be referred to as semantic segmentation of pixels in the at least two adjacent image segments. In an example, different material categories, for example, 'hair', 'skin', 'fabric', and the like could be related to a same object category, for example, such as a human present in the real-world environment. It will be appreciated that information pertaining to the at least two different material categories that are related to the same object category could be pre-determined by the at least one server, could be stored at and accessed from the data repository, as and when required. Therefore, when the aforesaid information is pre-determined and thus known to the at least one server, the at least two adjacent image segments can be easily and accurately detected. The at least one server may employ at least one convolutional neural network for a pixel-perfect semantically segmentation.

Upon detecting that the at least two adjacent image segments pertain to the at least two different material categories that are related to the same object category, the at least one server identifies the at least two adjacent depth segments that correspond to the respective ones of the at least two adjacent image segments, for subsequent optical depth correction as discussed later. Throughout the present disclosure, the term "depth segment" of the given depth data refers to a portion of the given depth data that represent optical depth values pertaining to a given object or its part present in the real-world environment.

In this regard, since the given depth data (corresponding to the given visible-light image) is already known to the at least one server, the at least two adjacent depth segments could be easily identified by the at least one server, as information related to all depth segments of the given depth data is readily available. Moreover, since the given visible-light image and the given depth data are contemporaneously captured from a same perspective of the at least one camera, locations of the at least two adjacent image segments in the given visible-light image could be utilized by the at least one server for estimating respective ones of corresponding locations of the at least two adjacent depth segments in the given depth data (that is obtained by the at least one server, for example, in form of the depth image).

It will be appreciated that in an ideal scenario when an entirety of the given depth data is of high quality (i.e., having a high resolution), optical depths represented in the at least two adjacent depth segments lie within a predefined range from each other (i.e., said optical depths do not considerably vary from each other). This is because the at least two adjacent depth segments represent optical depths of the different parts of the same object that are made of different materials, the different parts of the same object being in proximity with each other.

However, when some portion of the given depth data is of low quality (i.e., not acceptably accurate) for a particular area of the real-world environment having a poor reflectance, optical depths represented in the at least two adjacent depth segments would be considerably different (i.e., said optical depths significantly vary from each other). Typically, an important source of error in 3D reconstruction is incorrect depth values obtained by the at least one server in areas of the real-world environment having poor reflectance, such as human hair. As an example, when a human is located at a distance of 1.5 metres from the at least one camera in the real-world environment, depth signals corresponding to the hair of the human may show an optical depth of 3.5 metres. Thus, without any information about the material categories and their correlation with object categories, it is very difficult to ascertain if such samples of optical depth are due to some actual object at 3.5 metres, or due to erroneous depth data due to a property of an object or its part present in the real-world environment.

Optionally, in this regard, optical depths of the pixels representing the given object lie within a predefined range from each other, wherein the predefined range depends on the object category of the given object. In this regard, since different parts of the given object (i.e., different parts of a same object) are highly likely to be in proximity with each other, optical depths corresponding to the different parts of the given object are nearly similar, i.e., said optical depths do not considerably vary from each other and would lie within a predefined range from each other. As an example, when the given object is, for example, a human, the predefined range in which optical depths of pixels representing the human may lie from 0 centimetres to 50 centimetres. Such a predefined range could be beneficially utilized by the at least one server for correcting the errors in the optical depths represented in the at least one of the at least two adjacent depth segments.

It will be appreciated that more accurate adjacent depth segment(s) can be selected, based on the material category to which the adjacent depth segment(s) belongs. In other words, the remaining of the at least two adjacent depth segments having more accurate depth data than the at least one of the at least two adjacent depth segments is selected to correct errors in the at least one of the at least two adjacent depth segments, based on the material categories. In other words, it is pre-known which material categories are more prone to errors, for example, due to their reflectance. For example, human skin would have more accurate depth data as compared to human hair. Therefore, the at least one server corrects (namely, rectifies) erroneous optical depth values represented in the at least one of the at least two adjacent depth segments, based on acceptably accurate optical depth values represented in the remaining of the at least two adjacent depth segments. As an example, the optical depths represented in the at least one of the at least two adjacent depth segments are modified (namely, increased or decreased) according to values of the optical depths represented in the remaining of the at least two adjacent depth segments.

Optionally, the at least one server is configured to correct the errors in the optical depths, further based on an object category of a given object. As an example, when the given object is, for example, such as a human, optical depths of the at least two adjacent depth segments typically lie in a predefined range of 0 to 50 centimetres from each other. In such a case, the optical depths represented in the at least one of the at least two adjacent depth segments are modified according to said predefined range.

Optionally, when correcting the errors in the optical depths represented in the at least one of the at least two adjacent depth segments, the at least one server is configured to employ at least one image processing technique. Optionally, the at least one image processing technique is a bilateral filtering technique. Typically, the bilateral filtering technique is employed for smoothing images while preserving edge information of objects represented in the images, by way of using a nonlinear combination of pixel values of nearby pixels. In particular, said technique combines grey levels or colour values of the nearby pixels, based on both geometric closeness and photometric similarity of the nearby pixels with respect to each other. Moreover, a combination of space domain filtering and range filtering is generally employed in bilateral filtering. Space domain refers to a set of possible positions within the given visible-light image. This is related to a resolution, i.e., a number of rows and columns in the given visible-light image. Range refers to a set of possible pixel values of pixels in the given visible-light image, that is the number of bits used to represent a given pixel value. In this regard, a pixel value of a given pixel is replaced with an average of similar pixel values of the nearby pixels. For smooth regions in the images, pixel values of pixels in a small neighbourhood are similar to each other, and a value of a normalized similarity function is close to 1. Resultantly, the bilateral filtering technique acts essentially as a standard domain filter, and averages away minimal correlated differences between pixel values of pixels caused due to noise. The bilateral filtering technique is noniterative, easy to implement, and is well-known in the art. The bilateral filtering technique is described, for example, in "*Bilateral Filtering for Gray and Color Images*" by C. Tomasi and R. Manduchi, published in Proceedings of the IEEE International Conference on Computer Vision, pp. 839-846, 1998, which has been incorporated herein by reference. It will be appreciated that when correcting the aforesaid errors, the at least one server could employ information pertaining to which material categories (from amongst the different material categories) are related to which object categories, along with the bilateral filtering technique.

Optionally, in the method, the step of correcting the errors comprises:
- calculating a metric, based on the optical depths represented in the remaining of the at least two adjacent depth segments;
- calculating differences between the metric and the optical depths represented in the at least one of the at least two adjacent depth segments; and
- when a difference between the metric and a given optical depth represented in the at least one of the at least two adjacent depth segments is greater than a predefined difference,
  - identifying the given optical depth to be incorrect; and
  - correcting an error in the given optical depth based on the metric.

In this regard, since the optical depths represented in the remaining of the at least two adjacent depth segments are considerably more accurate than the optical depths represented in the at least one of the at least two adjacent depth segments, the metric is calculated based on the optical depths represented in the remaining of the at least two adjacent depth segments. The metric could, for example, be a statistical metric. Optionally, the metric could be one of: a median, an arithmetic mean, a weighted average, a maximum value, a minimum value of the optical depths represented in the remaining of the at least two adjacent depth segments. It will be appreciated that the at least one server employs at least one mathematical technique for calculating the metric, and the differences between the metric and said optical depths. Said differences between the metric and said optical depths could be absolute differences. Optionally, the predefined difference lies in a range of 20 centimetres to 100 centimetres. As an example, the predefined difference may be from 20, 30 or 40 centimetres up to 40, 50, 80 or 100 centimetres. More optionally, the predefined difference lies in a range of 30 centimetres to 75 centimetres. Yet more optionally, the predefined difference lies in a range of 30 centimetres to 50 centimetres.

Furthermore, greater the difference between the metric and the given optical depth represented in the at least one of the at least two adjacent depth segments, greater is the magnitude of the error in the given optical depth, and vice versa. Upon identifying the given optical depth to be incorrect, the given optical depth is modified (namely, increased or decreased) according to the metric. In an example, when a given optical depth is greater than the metric, a magnitude of the given optical depth may be decreased by an amount of the difference between the metric and the given optical depth. Similarly, when the metric is greater than a given optical depth, a magnitude of the given optical depth may be increased by an amount of the difference between the metric and the given optical depth. The technical benefit of calculating and employing the metric for correcting the error in the given optical depth is that it is relatively easy, simple to implement, and yields overall acceptably accurate results.

Notably, upon the aforesaid correction in the optical depths represented in the at least one of the at least two adjacent depth segments, the given depth data becomes acceptably accurate and of high quality. Such corrected depth data could then be utilised to generate a 3D model of the real-world environment that is highly realistic and accurate. Optionally, in this regard, the method further comprises:
- receiving pose information indicative of at least one of:
  - corresponding poses of the at least one camera from which the plurality of visible-light images and the depth data are captured,
  - relative poses of a given camera with respect to poses of at least one other given camera during capturing of the plurality of visible-light images, wherein the at least one camera comprises the given camera and the at least one other given camera; and
- processing the plurality of visible-light images to generate the three-dimensional model of the real-world environment, based on the depth data and the pose information.

Optionally, in this regard, the at least one server receives the pose information from any one of:
- a device comprising pose-tracking means and the at least one camera, wherein the at least one camera is implemented as a combination of the at least one visible-light camera and the at least one depth camera,
- external pose-tracking means,
- the data repository in which the pose information is prestored along with the plurality of visible-light images and the depth data.

The term "pose" encompasses both a position and an orientation. Optionally, the pose-tracking means is employed to detect and/or follow a pose of the at least one camera from which a given visible-light image and its corresponding depth data are captured. The pose tracking means may employ an outside-in tracking technique, an inside-out technique, or a combination of both the aforesaid techniques, for collecting pose-tracking data. Such techniques are well known in the art. The pose-tracking data may be in form of at least one of: images, Inertial Measurement Unit (IMU) values, Time-Inertial Measurement Unit (TIMU) values, motion sensor data values, magnetic field strength values.

Optionally, a processor of the device comprising the pose-tracking means and the at least one camera is configured to: process the pose-tracking data to determine a given pose of the at least one camera from which the given visible-light image is captured; and send, to the at least one server, pose information indicative of the given pose of the at least one camera. Optionally, said processor is configured to employ at least one data processing algorithm to process the pose-tracking data. Examples of the at least one data processing algorithm include a feature detection algorithm, an environment mapping algorithm, and a pose data extrapolation algorithm.

Optionally, a relative pose of the given camera with respect to a pose of the at least one other given camera is indicative of an offset between a pose of the given camera and a pose of the at least one other given camera. It will be appreciated that said relative pose could only be determined when both the given camera (or a given device comprising the given camera) and the at least one other given camera (or other given device comprising the at least one other given camera) are present in a same real-world environment.

Optionally, in this regard, a processor of the other given device is configured to:
- project a first pattern of light onto the real-world environment by a first active illuminator of the other given device, whilst detecting reflections of the first pattern of light off the real-world environment by a first active sensor of the other given device, wherein said reflections are detected from a pose of the other given device;
- determine shapes of surfaces present in the real-world environment and distances of the surfaces from the pose of the other given device, based on the pattern and its detected reflections;

obtain pattern information indicative of a second pattern of light projected onto the real-world environment by a second active illuminator of the given device;

employ the first active sensor to detect reflections of the second pattern of light off the real-world environment, wherein the reflections of the second pattern are detected from the pose of the other given device;

determine a relative pose of the given device with respect to the pose of the other given device, based on the shapes and the distances of the surfaces, the second pattern and its detected reflections. It will be appreciated that the relative pose of the given device with respect to the pose of the other given device corresponds to the relative pose of the given camera with respect to the pose of the at least one other given camera.

Throughout the present disclosure, the term "three-dimensional model" of the real-world environment refers to a data structure that comprises comprehensive information pertaining to a 3D space of the real-world environment. Such a comprehensive information is indicative of at least one of: surfaces of the objects or their parts present in the real-world environment, a plurality of features of the objects or their parts present in the real-world environment, shapes and sizes of the objects or their parts, poses of the objects or their parts, materials of the objects or their parts, colour and depth information of the objects or their portions, light sources and lighting conditions within the real-world environment. The object could be a living object (for example, such as a human, a pet, a plant, and the like) or a non-living object (for example, such as a wall, a window, a toy, a poster, a lamp, and the like). It is to be understood that the living object (such as the human and the pet) could be either stationary, or moving. Examples of the plurality of features include, but are not limited to, edges, corners, blobs and ridges. Optionally, the 3D model of the real-world environment is in form of at least one of: a 3D polygonal mesh, a 3D point cloud, a 3D surface cloud, a voxel-based model, a parametric model, a 3D grid, a 3D hierarchical grid, a bounding volume hierarchy, an image-based 3D model. The 3D polygonal mesh could be a 3D triangular mesh or a 3D quadrilateral mesh.

Optionally, when the plurality of visible-light images are processed based on the corrected depth data and the pose information, the at least one server utilizes the optical depths of the objects or their parts from different perspectives of poses of the at least one camera when generating the 3D model of the real-world environment. In other words, information pertaining to the visual representation as well as the optical depths in the real-world environment is accurately known to the at least one server, in great detail from various perspectives of the at least one camera. Thus, the 3D model would further include information pertaining to placements, geometries, occlusions, and the like, of the objects or their parts from the various perspectives of the at least one camera. Beneficially, the 3D model generated by utilising the corrected depth data is accurate (for example, in terms of image reconstruction), realistic, and is information-rich (i.e., comprehensive).

Optionally, when processing the plurality of visible-light images to generate the 3D model, the at least one server is configured to employ at least one data processing algorithm. Optionally, in this regard, the at least one data processing algorithm is at least one of: a feature extraction algorithm, an image stitching algorithm, an image merging algorithm, an interpolation algorithm, a 3D modelling algorithm, a photogrammetry algorithm, an image layering algorithm, an image blending algorithm. Such data processing algorithms are well-known in the art.

Moreover, optionally, the method further comprises:

conjoining the at least two adjacent image segments into a single conjoined image segment;

indicating the single conjoined image segment in a segmentation mask to identify pixels representing a given object of the same object category, wherein the segmentation mask represents object categories to which pixels in the given visible-light image belong; and employing the segmentation mask when correcting the errors in the optical depths.

Optionally, when conjoining the at least two adjacent image segments into the single conjoined image segment, the at least one server is configured to employ to at least one image processing algorithm. Optionally, in this regard, the at least one image processing algorithm employs at least one of: merging, blending at overlapping boundaries.

Moreover, in an ideal scenario, pixels in the single conjoined image segment would have similar depth information. In other words, optical depths represented in depth data corresponding to the single conjoined image segment would not considerably vary from each other and would lie within a predefined range from each other. Therefore, when the single conjoined image segment is indicated in the segmentation mask, the at least one server can easily and accurately identify optical depths corresponding to which pixels in the single conjoined image segment are incorrect, and correct errors in said optical depths. Herein, the term "segmentation mask" refers to a digital mask for indicating the pixels representing (an entirety of) the given object of the same object category. Such a digital mask is optionally in a form of a per-pixel mask or per-pixel confidences. Moreover, the segmentation mask may or may not have a defined shape and/or size. The technical benefit of employing the segmentation mask is that it allows the at least one server to process the depth data quickly. Moreover, the at least one server utilizes the segmentation mask for obtaining accurate depth estimation at edges represented in the given visible-light image and for outlier processing (namely, filtering out any outliers).

Optionally, the steps of identifying the image segments and detecting when adjacent image segments pertain to material categories that are related to the same object category are performed by utilising a machine learning method for visible-light images in which per-pixel masks or per-pixel confidences are generated, based on grouping semantically similar objects present in the visible-light images to their own object categories. Implementations of such semantic segmentation are based on convolutional neural networks. These networks could be trained in supervised manner by providing such networks with ideal input images and corresponding segmentation masks. Learning such semantic segmentation based on real data expectedly produces high quality segmentation masks as compared to purely edge-based methods.

Furthermore, optionally, the method further comprises:

detecting whether the at least two adjacent image segments of the given visible-light image represent a dynamic object;

when it is detected that the at least two adjacent image segments represent a dynamic object, assigning an expiry time to colour data of the at least two adjacent image segments and depth data of the at least two adjacent depth segments; and replacing the colour data that was stored based on the depth data in a three-dimensional model of the real-world environment with new colour data based on new depth data, after the expiry time is over.

Optionally, when detecting whether the at least two adjacent image segments represents the dynamic object, the at least one server is configured to employ at least one object detection algorithm. Examples of the at least one object detection algorithm include, but are not limited to, a K-means algorithm, an Iterative Self-Organizing Data Analysis Technique (ISODATA) algorithm, a geometric features matching algorithm, a logistic regression algorithm, a decision tree algorithm, a Naive Bayes classifier algorithm, a K-nearest neighbours (KNN) algorithm, a Support Vector Machine (SVM) algorithm. It is to be understood that the dynamic object is an object present in the real-world environment whose properties (such as a pose, a shape, a size, and the like) change with respect to time. Examples of the dynamic object include, but are not limited to, a human, an animal, a robot. It will be appreciated that the detection of whether the at least two adjacent image segments represent the dynamic object could be performed on a per-pixel basis. This means that it is detected whether a given pixel in the at least two adjacent image segments is representative of the dynamic object.

Since the properties of the dynamic object change with respect to time, for example, when a pose of the dynamic object changes within the real-world environment, both the colour data and the depth data corresponding to the dynamic object change. Therefore, the at least one server assigns the expiry time (namely, a lifetime) to the colour data and the depth data such that when the expiry time is over, the at least one server would update (i.e., replace) the (old) colour data with the new colour data. In this way, the 3D model of the real-world environment is updated (in real time or near-real time) by the at least one server upon replacing the (old) colour data with the new colour data. Beneficially, in such a case, the (updated) 3D model facilitates in high quality, accurate, and realistic image reconstruction corresponding to different novel viewpoints.

It will be appreciated that the colour data and the depth data of pixels representing the dynamic object would have a shorter expiry time, as compared to colour data and depth data of pixels representing a static object (namely, an object whose properties do not change with respect to time). Optionally, the expiry time of the colour data and the depth data corresponding to the dynamic object lies in a range of 0 second to 10 seconds. As an example, the expiry time may be from 0, 0.5, 1 or 2 seconds up to 2.5, 5 or 10 seconds. More optionally, the expiry time of the colour data and the depth data corresponding to the dynamic object lies in a range of 0 second to 5 seconds. Yet more optionally, the expiry time of the colour data and the depth data corresponding to the dynamic object lies in a range of 0 second to 2.5 seconds. The aforesaid expiry time may be either system defined or user defined. Furthermore, the colour data could be in form of one of: Red-Green-Blue (RGB) values, Red-Green-Blue-Alpha (RGB-A) values, Cyan-Magenta-Yellow-Black (CMYK) values, Luminance and two-colour differences (YUV) values.

It will also be appreciated that a presence of dynamic content (i.e., the dynamic object) in the given visible-light image could be detected, for example, for every $N^{th}$ visible-light image, by utilizing either semantic segmentation or a (light-weight) convolution neural network that is trained for binary classification for the presence of the dynamic content. As an example, such detection could be performed for every $10^{th}$ visible-light image. Upon detection of the presence of dynamic content, the semantic segmentation could be switched on for each visible-light image, until dynamic objects are not detected anymore. As an example, said semantic segmentation can be executed at a framerate of 30-50 frames per second (FPS) using a modern GPU hardware.

Moreover, optionally, the method further comprises:
  detecting whether the given visible-light image represents at least one dynamic object; and
  only when it is detected that the given visible-light image represents at least one dynamic object, performing the step of detecting whether at least two image segments in the given visible-light image pertain to at least two different material categories that are related to a same object category.

Optionally, when detecting whether the given visible-light image represents the at least one dynamic object, the at least one server is configured to employ the at least one object detection algorithm. Examples of the at least one object detection algorithm have been already described earlier. It will be appreciated that the aforesaid detection could be performed on a per-pixel basis. This means that it is detected whether a given pixel in given visible-light image is representative of the at least one dynamic object.

When it is detected that the given visible-light image represents the at least one dynamic object, it is highly likely that the at least one dynamic object is that object whose parts correspond to the at least two different material categories that are related to the same object category. Moreover, in such a case, given depth data corresponding to the at least one dynamic object or its part may not be acceptably accurate, and thus need to be subsequently corrected by the at least one server. Thus, only when it is known that the given visible-light image represents the at least one dynamic object, the at least one server identifies image segments of the given visible-light image that represent the at least one dynamic object, and detects that the at least two image segments pertain to the at least two different material categories that are related to the same object category.

The technical benefit of performing the aforementioned steps only when it is detected that the given visible-light image represents the at least one dynamic object is that processing resources and processing time of the at least one server is considerably reduced. This is because the at least one server need not employ its processing resources to perform the aforementioned steps when the given visible-light image does not represent the at least one dynamic object.

Furthermore, optionally, the at least one camera comprises at least one pair of stereo cameras, the plurality of visible-light images comprising pairs of stereo images, wherein the method further comprises stereo-reconstructing edges of image segments present in a given pair of stereo images. In this regard, a given first image from amongst the given pair of stereo images is captured with respect to a perspective of a first camera of the at least one pair of stereo cameras, while a given second image from amongst the given pair of stereo images is captured with respect to a perspective of a second camera of the at least one pair of stereo cameras. The given first image and the given second image constitute the given pair of stereo images, for example, for user's eyes. The given pair of stereo images represents a given visual scene of the real-world environment in a 3D realistic manner. Optionally, the at least one server is configured to process the given first image and the given second image for matching pixels of both the aforesaid images that represent a same 3D point or a same 3D region in the real-world environment, and to determine binocular disparities between the matched pixels of the aforesaid images. These binocular disparities are then processed by the at least one server (for example, using a triangulation technique), for stereo-reconstructing the edges of the image segments present in the given pair of stereo images.

The technical benefit of performing the aforesaid stereo-reconstruction of the edges is that the edges of the image segments are identified accurately. Beneficially, in such a case, the 3D model of the real-world environment generated using such images would be highly accurate and highly realistic. As a result, when the 3D model is utilised for image reconstruction, edges of objects in the reconstructed image is clearly visible and appears to be smooth. Moreover, none of pixels of the objects or their parts leak to background and leave any undesirable artifacts.

The present disclosure also relates to the system and the computer program product as described above. Various embodiments and variants disclosed above, with respect to the aforementioned first aspect, apply mutatis mutandis to the system and the computer program product.

Optionally, the at least one server is configured to:
receive pose information indicative of at least one of:
  corresponding poses of the at least one camera from which the plurality of visible-light images and the depth data are captured,
  relative poses of a given camera with respect to poses of at least one other given camera during capturing of the plurality of visible-light images, wherein the at least one camera comprises the given camera and the at least one other given camera; and
process the plurality of visible-light images to generate a three-dimensional model of the real-world environment, based on the depth data and the pose information.

Optionally, the at least one server is configured to:
conjoin the at least two adjacent image segments into a single conjoined image segment;
indicate the single conjoined image segment in a segmentation mask to identify pixels representing a given object of the same object category, wherein the segmentation mask represents object categories to which pixels in the given visible-light image belong; and
employ the segmentation mask when correcting the errors in the optical depths.

Optionally, optical depths of the pixels representing the given object lie within a predefined range from each other, wherein the predefined range depends on the object category of the given object.

Optionally, the at least one server is configured to:
detect whether the at least two adjacent image segments of the given visible-light image represent a dynamic object;
when it is detected that the at least two adjacent image segments represent a dynamic object, assign an expiry time to colour data of the at least two adjacent image segments and depth data of the at least two adjacent depth segments; and
replace the colour data that was stored based on the depth data in a three-dimensional model of the real-world environment with new colour data based on new depth data, after the expiry time is over.

Optionally, in the system, the at least one camera comprises at least one pair of stereo cameras, the plurality of visible-light images comprising pairs of stereo images, wherein the at least one server is configured to stereo-reconstruct edges of image segments present in a given pair of stereo images.

Optionally, when correcting the errors, the at least one server is configured to:
calculate a metric, based on the optical depths represented in the remaining of the at least two adjacent depth segments;
calculate differences between the metric and the optical depths represented in the at least one of the at least two adjacent depth segments; and
when a difference between the metric and a given optical depth represented in the at least one of the at least two adjacent depth segments is greater than a predefined difference,
  identify the given optical depth to be incorrect; and
  correct an error in the given optical depth based on the metric.

Optionally, the at least one server is configured to:
detect whether the given visible-light image represents at least one dynamic object; and
only when it is detected that the given visible-light image represents at least one dynamic object, detect whether at least two image segments in the given visible-light image pertain to at least two different material categories that are related to a same object category.

DETAILED DESCRIPTION OF THE DRAWINGS

Figure 2:
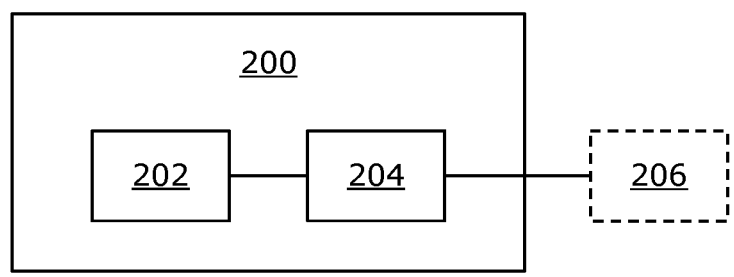
FIG. 2 illustrates a block diagram of architecture of a system for improving depth maps and three-dimensional (3D) reconstruction, in accordance with an embodiment of the present disclosure.

Referring to FIG. 2, illustrated is a block diagram of architecture of a system 200 for improving depth maps and three-dimensional (3D) reconstruction, in accordance with an embodiment of the present disclosure. The system 200 comprises a data repository 202 and at least one server (depicted as a server 204). The data repository 202 is communicably coupled to the server 204. Optionally, the server 204 is communicably coupled to at least one camera (depicted as a camera 206) or at least one device (not shown) comprising the camera 206.

It may be understood by a person skilled in the art that the FIG. 2 includes a simplified architecture of the system 200 for sake of clarity, which should not unduly limit the scope of the claims herein. It is to be understood that the specific implementation of the system 200 is provided as an example and is not to be construed as limiting it to specific numbers or types of servers, data repositories, and cameras. The person skilled in the art will recognize many variations, alternatives, and modifications of embodiments of the present disclosure.

Figure 3A:
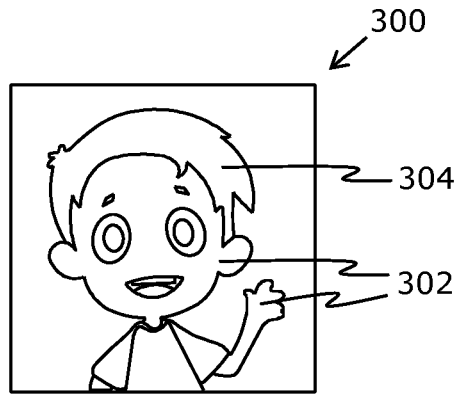
FIG. 3A illustrates a visible-light image captured by a camera.
Figure 3B:
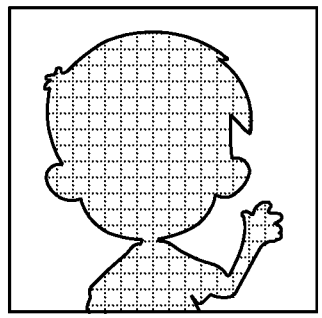
Figure 3C:
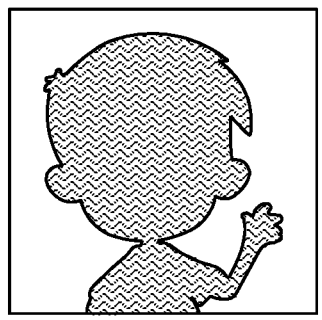
FIG. 3C illustrates a corrected depth image corresponding to the visible-light image, in accordance with an embodiment of the present disclosure.

Referring to FIGS. 3A, 3B, and 3C, FIG. 3A is a schematic representation of a visible-light image 300 captured by a camera, FIG. 3B is a schematic representation of a segmentation mask (depicted as a dotted grid pattern) corresponding to the visible-light image 300, while FIG. 3C is a schematic representation of a corrected depth map corresponding to the visible-light image 300, in accordance with an embodiment of the present disclosure. With reference to FIG. 3A, the visible-light image 300 represents a living object, for example, such as a human present in a real-world environment. There are shown different parts of the human belonging to different material categories, for example, such as skin 302 and hair 304 of the human. With reference to FIG. 3B, a single conjoined image segment of the visible-light image 300 that represents both pixels corresponding to the skin 302 and pixels corresponding to the hair 304 of the human is indicated in the segmentation mask. The segmentation mask enables to identify pixels representing (an entirety of) the human. In this regard, the segmentation mask is employed for correcting errors in optical depths represented in some depth segments of a depth map captured corresponding to the visible-light image. With reference to FIG. 3C, upon aforesaid correction of the errors, the corrected depth map is produced. As shown, the corrected depth map represents accurate and consistent optical depths represented in a depth segment (depicted as a zig-zag pattern) corresponding to both the hair 304 and the skin 302 of the human. Moreover, edges and boundary of the depth segment are proper and accurate as compared to the prior art.

FIGS. 3A-3C, are merely examples, which should not unduly limit the scope of the claims herein. The person skilled in the art will recognize many variations, alternatives, and modifications of embodiments of the present disclosure.

Figure 4:
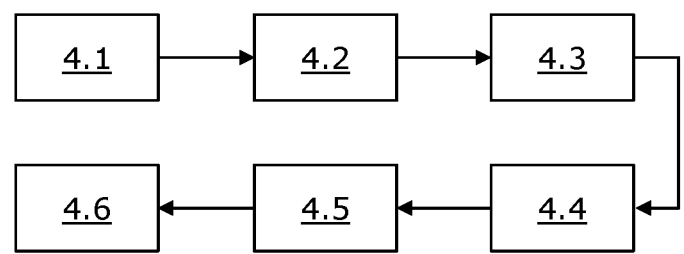
FIG. 4 illustrates a process flow for replacing colour data of a given image segment after an expiry time assigned to said colour data is over, in accordance with an embodiment of the present disclosure.

Referring to FIG. 4, illustrated is a process flow for replacing colour data of a given image segment after an expiry time assigned to said colour data is over, in accordance with an embodiment of the present disclosure. At step 4.1, a plurality of visible-light images of a real-world environment and depth data corresponding to the plurality of visible-light images are received, the plurality of visible-light images being captured using at least one camera. At step 4.2, image segments of a given visible-light image that represent objects or their parts belonging to different material categories are identified, the objects being present in the real-world environment. At step 4.3, it is detected whether at least two adjacent image segments in the given visible-light image pertain to at least two different material categories that are related to a same object category. When it is detected that at least two adjacent image segments pertain to at least two different material categories that are related to a same object category, step 4.4 is performed, where it is detected whether the at least two adjacent image segments of the given visible-light image represent a dynamic object. When it is detected that the at least two adjacent image segments represent a dynamic object, step 4.5 is performed, where an expiry time is assigned to colour data of the at least two adjacent image segments and depth data of the at least two adjacent depth segments. At step 4.6, the colour data that was stored based on the depth data is replaced in a three-dimensional model of the real-world environment with new colour data based on new depth data, after the expiry time is over.

Figure 5:
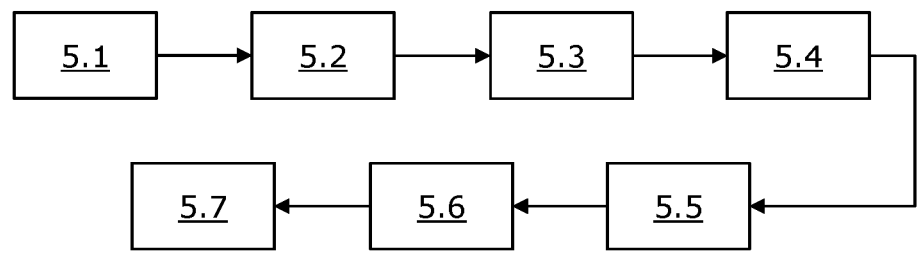
FIG. 5 illustrated a process flow for correcting an error in an optical depth, in accordance with an embodiment of the present disclosure.

Referring to FIG. 5, illustrated is a process flow for correcting an error in an optical depth, in accordance with an embodiment of the present disclosure. At step 5.1, a plurality of visible-light images of a real-world environment and depth data corresponding to the plurality of visible-light images are received, the plurality of visible-light images being captured using at least one camera. At step 5.2, image segments of a given visible-light image that represent objects or their parts belonging to different material categories are identified, the objects being present in the real-world environment. At step 5.3, it is detected whether at least two adjacent image segments in the given visible-light image pertain to at least two different material categories that are related to a same object category. When it is detected that at least two adjacent image segments pertain to at least two different material categories that are related to a same object category, step 5.4 is performed, where at least two adjacent depth segments of given depth data are identified corresponding to respective ones of the at least two adjacent image segments of the given visible-light image. Notably, errors in optical depths represented in at least one of the at least two adjacent depth segments are to be corrected, based on optical depths represented in remaining of the at least two adjacent depth segments. In this regard, at step 5.5, a metric is calculated, based on the optical depths represented in the remaining of the at least two adjacent depth segments. At step 5.6, differences between the metric and the optical depths represented in the at least one of the at least two adjacent depth segments are calculated. When a difference between the metric and a given optical depth represented in the at least one of the at least two adjacent depth segments is greater than a predefined difference, step 5.7 is performed, where the given optical depth is identified to be incorrect and an error in the given optical depth is corrected based on the metric.

Figure 6:
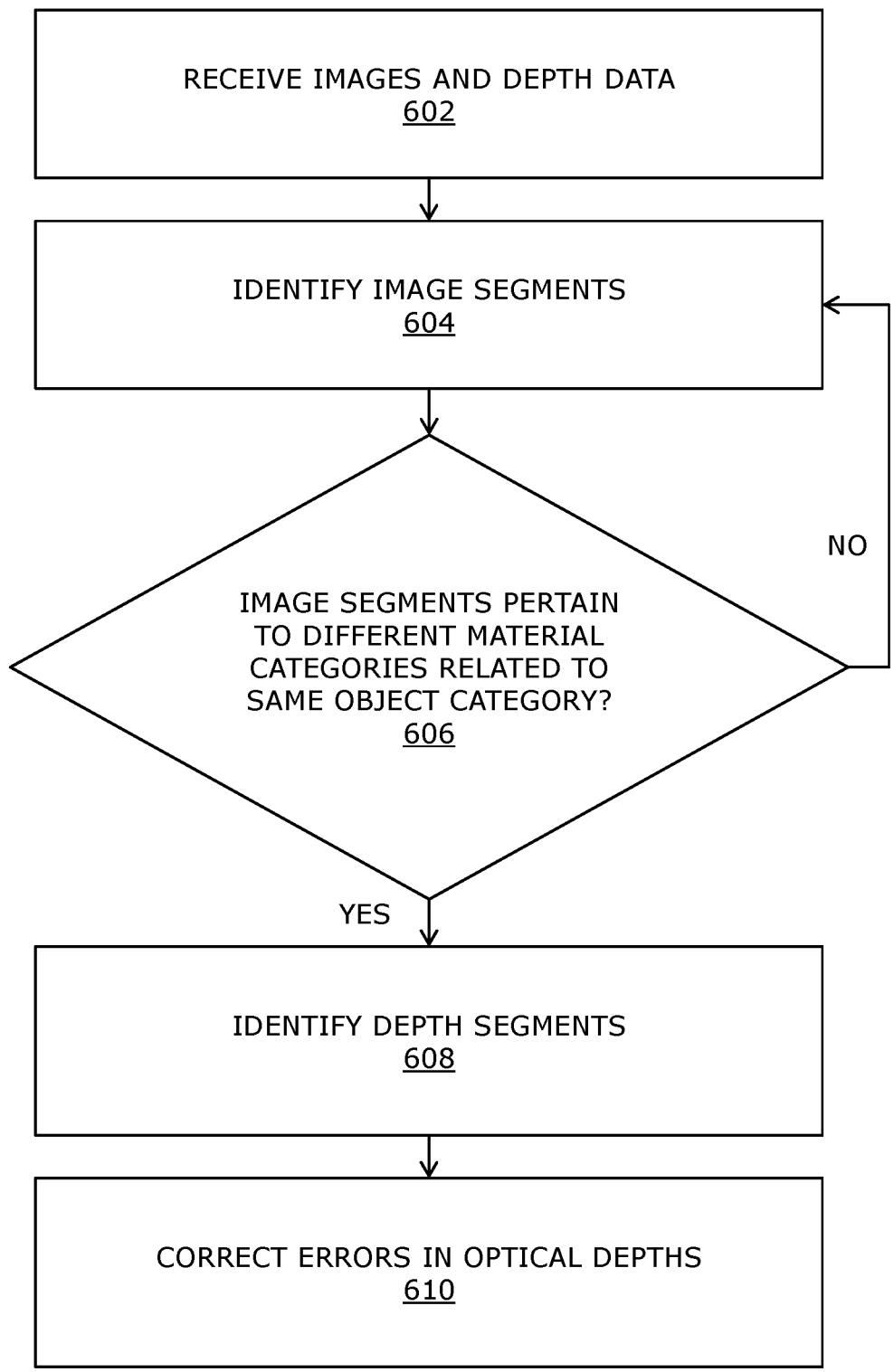
FIG. 6 illustrates steps of a computer-implemented method for improving depth maps and 3D reconstruction, in accordance with an embodiment of the present disclosure.

Referring to FIG. 6, illustrated are steps of a computer-implemented method for improving depth maps and 3D reconstruction with segmentation masks, in accordance with an embodiment of the present disclosure. At step 602, a plurality of visible-light images of a real-world environment and depth data corresponding to the plurality of visible-light images are received, the plurality of visible-light images being captured using at least one camera. At step 604, image segments of a given visible-light image that represent objects or their parts belonging to different material categories are identified, the objects being present in the real-world environment. At step 606, it is detected whether at least two adjacent image segments in the given visible-light image pertain to at least two different material categories that are related to a same object category. When it is detected that at least two adjacent image segments pertain to at least two different material categories that are related to a same object category, step 608 is performed, where at least two adjacent depth segments of given depth data are identified corresponding to respective ones of the at least two adjacent image segments of the given visible-light image. Then, at step 610, errors in optical depths represented in at least one of the at least two adjacent depth segments are corrected, based on optical depths represented in remaining of the at least two adjacent depth segments. Otherwise, when it is detected that at least two adjacent image segments do not pertain to at least two different material categories that are related to a same object category, processing repeats for a subsequent image at step 604.

The aforementioned steps are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A computer-implemented method comprising:
  receiving a plurality of visible-light images of a real-world environment captured using at least one camera and depth data captured corresponding to the plurality of visible-light images;
  identifying image segments of a given visible-light image that represent objects or their parts belonging to different material categories, the objects being present in the real-world environment;

detecting whether at least two adjacent image segments in the given visible-light image pertain to at least two different material categories that are related to a same object category; and when it is detected that at least two adjacent image segments pertain to at least two different material categories that are related to a same object category,
identifying at least two adjacent depth segments of given depth data corresponding to respective ones of the at least two adjacent image segments of the given visible-light image; and
correcting errors in optical depths represented in at least one of the at least two adjacent depth segments, based on optical depths represented in remaining of the at least two adjacent depth segments.

2. The computer-implemented method of claim 1, further comprising:
receiving pose information indicative of at least one of:
corresponding poses of the at least one camera from which the plurality of visible-light images and the depth data are captured,
relative poses of a given camera with respect to poses of at least one other given camera during capturing of the plurality of visible-light images, wherein the at least one camera comprises the given camera and the at least one other given camera; and
processing the plurality of visible-light images to generate a three-dimensional model of the real-world environment, based on the depth data and the pose information.

3. The computer-implemented method of claim 1, further comprising:
conjoining the at least two adjacent image segments into a single conjoined image segment;
indicating the single conjoined image segment in a segmentation mask to identify pixels representing a given object of the same object category, wherein the segmentation mask represents object categories to which pixels in the given visible-light image belong; and
employing the segmentation mask when correcting the errors in the optical depths.

4. The computer-implemented method of claim 3, wherein optical depths of the pixels representing the given object lie within a predefined range from each other, wherein the predefined range depends on the object category of the given object.

5. The computer-implemented method of claim 1, further comprising:
detecting whether the at least two adjacent image segments of the given visible-light image represent a dynamic object;
when it is detected that the at least two adjacent image segments represent a dynamic object, assigning an expiry time to colour data of the at least two adjacent image segments and depth data of the at least two adjacent depth segments; and
replacing the colour data that was stored based on the depth data in a three-dimensional model of the real-world environment with new colour data based on new depth data, after the expiry time is over.

6. The computer-implemented method of claim 1, wherein the at least one camera comprises at least one pair of stereo cameras, the plurality of visible-light images comprising pairs of stereo images, the method further comprising stereo-reconstructing edges of image segments present in a given pair of stereo images.

7. The computer-implemented method of claim 1, wherein the step of correcting the errors comprises:
calculating a metric, based on the optical depths represented in the remaining of the at least two adjacent depth segments;
calculating differences between the metric and the optical depths represented in the at least one of the at least two adjacent depth segments; and
when a difference between the metric and a given optical depth represented in the at least one of the at least two adjacent depth segments is greater than a predefined difference,
identifying the given optical depth to be incorrect; and
correcting an error in the given optical depth based on the metric.

8. The computer-implemented method of claim 1, further comprising:
detecting whether the given visible-light image represents at least one dynamic object; and
only when it is detected that the given visible-light image represents at least one dynamic object, performing the step of detecting whether at least two image segments in the given visible-light image pertain to at least two different material categories that are related to a same object category.

9. A computer program product comprising a non-transitory machine-readable data storage medium having stored thereon program instructions that, when executed by a processor, cause the processor to execute steps of a computer-implemented method of claim 1.

10. A system comprising at least one server and a data repository communicably coupled to the at least one server, wherein the at least one server is configured to:
receive a plurality of visible-light images of a real-world environment captured using at least one camera and depth data captured corresponding to the plurality of visible-light images;
identify image segments of a given visible-light image that represent objects or their parts belonging to different material categories, the objects being present in the real-world environment;
detect whether at least two adjacent image segments in the given visible-light image pertain to at least two different material categories that are related to a same object category, wherein information pertaining to the at least two different material categories that are related to the same object category is accessed from the data repository; and
when it is detected that at least two adjacent image segments pertain to at least two different material categories that are related to a same object category,
identify at least two adjacent depth segments of given depth data corresponding to respective ones of the at least two adjacent image segments of the given visible-light image; and
correct errors in optical depths represented in at least one of the at least two adjacent depth segments, based on optical depths represented in remaining of the at least two adjacent depth segments.

11. The system of claim 10, wherein the at least one server is configured to:
receive pose information indicative of at least one of:
corresponding poses of the at least one camera from which the plurality of visible-light images and the depth data are captured,
relative poses of a given camera with respect to poses of at least one other given camera during capturing of the plurality of visible-light images, wherein the at least one camera comprises the given camera and the at least one other given camera; and
process the plurality of visible-light images to generate a three-dimensional model of the real-world environment, based on the depth data and the pose information.

12. The system of claim 10, wherein the at least one server is configured to:
conjoin the at least two adjacent image segments into a single conjoined image segment;
indicate the single conjoined image segment in a segmentation mask to identify pixels representing a given object of the same object category, wherein the segmentation mask represents object categories to which pixels in the given visible-light image belong; and
employ the segmentation mask when correcting the errors in the optical depths.

13. The system of claim 12, wherein optical depths of the pixels representing the given object lie within a predefined range from each other, wherein the predefined range depends on the object category of the given object.

14. The system of claim 10, wherein the at least one server is configured to:
detect whether the at least two adjacent image segments of the given visible-light image represent a dynamic object;
when it is detected that the at least two adjacent image segments represent a dynamic object, assign an expiry time to colour data of the at least two adjacent image segments and depth data of the at least two adjacent depth segments; and
replace the colour data that was stored based on the depth data in a three-dimensional model of the real-world environment with new colour data based on new depth data, after the expiry time is over.

15. The system of claim 10, wherein the at least one camera comprises at least one pair of stereo cameras, the plurality of visible-light images comprising pairs of stereo images, wherein the at least one server is configured to stereo-reconstruct edges of image segments present in a given pair of stereo images.

16. The system of claim 10, wherein when correcting the errors, the at least one server is configured to:
calculate a metric, based on the optical depths represented in the remaining of the at least two adjacent depth segments;
calculate differences between the metric and the optical depths represented in the at least one of the at least two adjacent depth segments; and
when a difference between the metric and a given optical depth represented in the at least one of the at least two adjacent depth segments is greater than a predefined difference,
identify the given optical depth to be incorrect; and
correct an error in the given optical depth based on the metric.

17. The system of claim 10, wherein the at least one server is configured to:
detect whether the given visible-light image represents at least one dynamic object; and
only when it is detected that the given visible-light image represents at least one dynamic object, detect whether at least two image segments in the given visible-light image pertain to at least two different material categories that are related to a same object category.

\* \* \* \* \*